United States Patent [19]

Bessho et al.

[11] Patent Number: 5,091,898
[45] Date of Patent: Feb. 25, 1992

[54] PLAYBACK/RECORDING APPARATUS HAVING A DEVICE FOR POSITIVELY PREVENTING ENTIRE CARTRIDGE FROM SPRINGING OUT OF SLOT

[75] Inventors: Akira Bessho; Youichi Konno, both of Saitama, Japan

[73] Assignee: Pioneer Electronic Corporation, Tokyo, Japan

[21] Appl. No.: 206,463

[22] Filed: Jun. 14, 1988

[30] Foreign Application Priority Data

Aug. 6, 1987 [JP] Japan .................. 62-120647[U]

[51] Int. Cl.$^5$ ................ G11B 25/04; G11B 17/04; G11B 5/012
[52] U.S. Cl. .................... 369/77.2; 369/77.1; 360/97.01; 360/99.06
[58] Field of Search ............ 369/77.1, 77.2, 75.2, 369/79, 75.1; 360/99.06, 99.12, 97, 96.5, 93

[56] References Cited

U.S. PATENT DOCUMENTS

| | | |
|---|---|---|
| 3,943,567 | 3/1976 | Kazuo . |
| 4,310,864 | 1/1982 | Patel et al. . |
| 4,345,283 | 8/1982 | Maryschka ........................ 360/96.6 |
| 4,607,361 | 8/1986 | Schuitmaker et al. ......... 369/270 X |
| 4,654,734 | 3/1987 | Shimaoka et al. ........... 360/99.06 X |
| 4,688,206 | 8/1987 | Nakagawa et al. ................. 369/291 |
| 4,724,498 | 2/1988 | Takikawa et al. ............. 369/77.1 X |
| 4,764,917 | 8/1988 | Sugihara et al. .............. 369/75.1 X |
| 4,794,479 | 12/1988 | Nakanishi ........................ 369/99.06 |
| 4,823,214 | 4/1989 | Davis ............................ 369/77.2 X |
| 4,829,504 | 5/1989 | Sunaga et al. ................. 369/77.2 X |

FOREIGN PATENT DOCUMENTS

| | | |
|---|---|---|
| 357783 | 7/1980 | Austria . |
| 2221435 | 6/1977 | Fed. Rep. of Germany . |
| 2729835 | 1/1978 | Fed. Rep. of Germany . |
| 2127205 | 4/1984 | United Kingdom ............ 360/99.02 |

Primary Examiner—Stuart S. Levy
Assistant Examiner—Joseph A. Rhoa
Attorney, Agent, or Firm—Sughrue, Mion, Zinn, Macpeak & Seas

[57] ABSTRACT

A playback/recording apparatus for a cartridge-contained disk includes a casing having a slot, a cartridge holder having an opening aligned with the slot, a conveyance mechanism for moving the cartridge holder and cartridge therein between a fully inserted position of the cartridge and a playback/recording position, and a playback/recording mechanism for recording on or reproducing from the disk. The apparatus has resilient members, mounted on the holder, for engaging with the cartridge after insertion. The resilient members are capable of being reciprocated in the directions of insertion and discharge of the cartridge. Stoppers limit the ranges of the reciprocation of the resilient members. During insertion of the cartridge, the resilient members engage with the cartridge and come into contact with recesses in the cartridge. An urging mechanism urges the cartridge toward the outside of a slot. The engagement of the resilient members and recesses in the cartridge, coacting with a forwardmost pair of stoppers, positively prevent the cartridge from springing out of the slot.

11 Claims, 3 Drawing Sheets

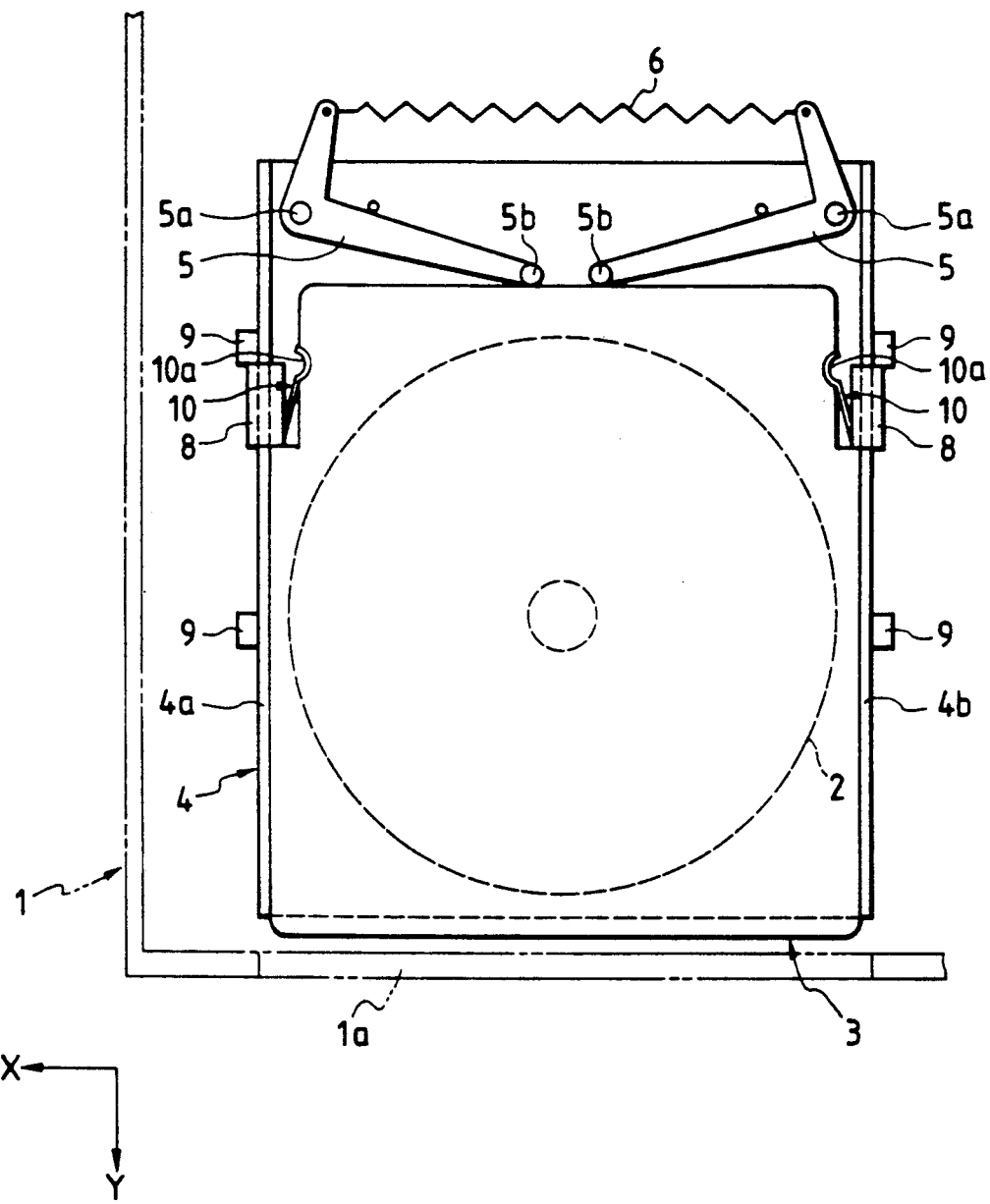

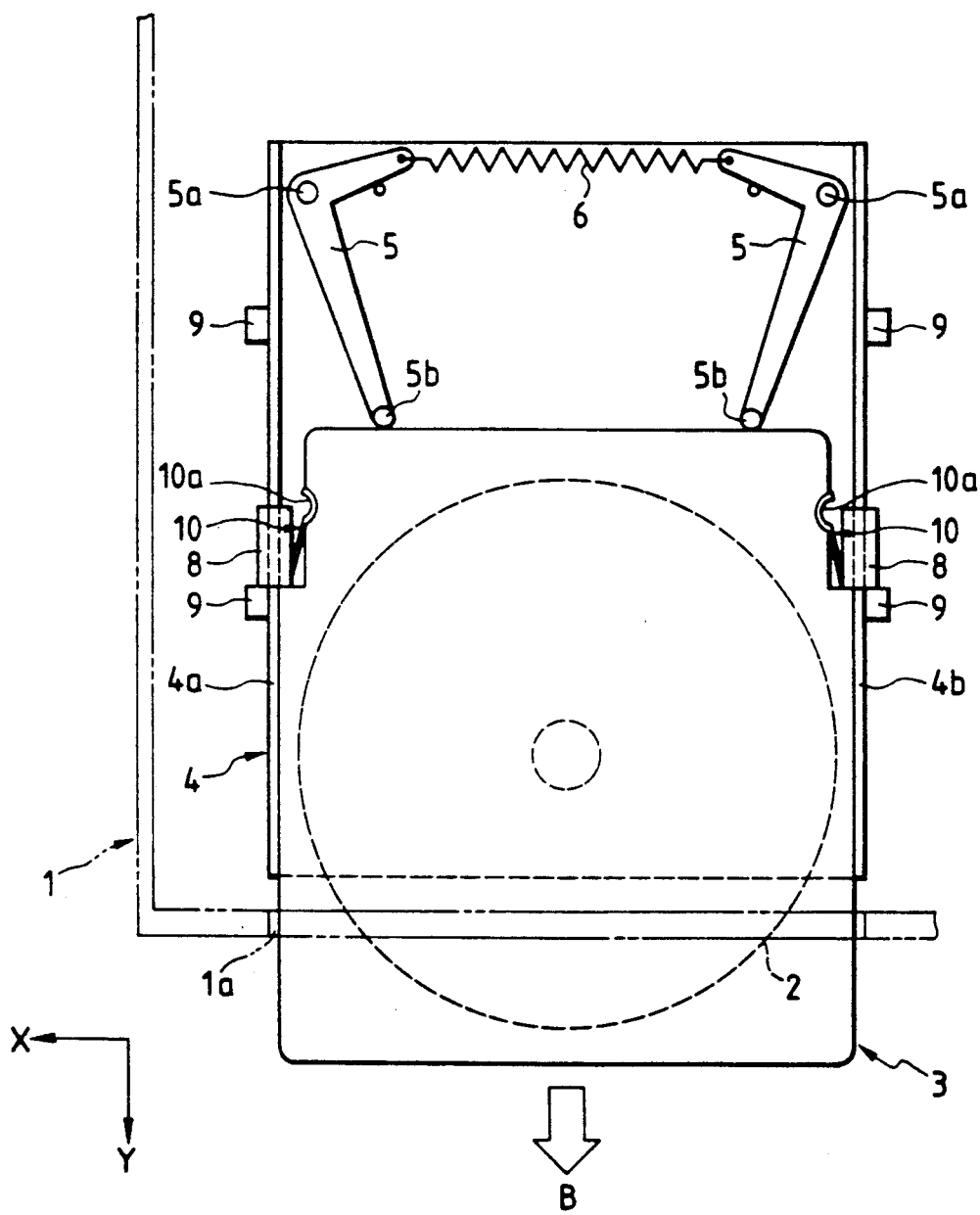

PLAYBACK/RECORDING APPARATUS HAVING A DEVICE FOR POSITIVELY PREVENTING ENTIRE CARTRIDGE FROM SPRINGING OUT OF SLOT

BACKGROUND OF THE INVENTION

The present invention relates to an apparatus for a playback/recording disk contained in a cartridge.

Recently, a disk player for playing a disk while the disk is rotatably contained within a relatively flat cartridge has been developed. The cartridge containing the disk is inserted into a casing of the disk player through a slot opening in a front panel of the casing. The casing encompasses a playing mechanism of the disk player. The playing mechanism is formed by a turntable, a pickup and so forth, a cartridge holder and a conveyance mechanism. The cartridge holder houses the inserted cartridge, and the conveyance mechanism conveys the cartridge holder and thus the cartridge from a level even with the slot to a playback level or position on the turntable and also operates to return the cartridge from the playback position to the level of the slot. On the cartridge holder there is a mechanism for urging the cartridge toward the slot to eject the cartridge through the slot to enable the whole cartridge to be manually removed from the player. A proposed urging mechanism includes a spring and levers coupled to the spring to engage and protrude the cartridge out of the slot by the urging force of the spring. It has also been proposed to use a locking mechanism for locking the urging mechanism in place to prevent the urging force from acting while the cartridge holder and cartridge are being conveyed by the conveyance mechanism and while the disk is being played. After playback, the cartridge holder and cartridge are returned to the level of the slot, and the urging mechanism is released to eject the cartridge. However, a disk player constructed as described above has a problem in that the whole cartridge springs out of the slot due to the urging force of the urging mechanism as soon as it is released, i.e. as soon as the locking mechanism is released. The cartridge can thus be subjected to damage.

SUMMARY OF THE INVENTION

It is an object of the present invention to solve the above-mentioned problem.

In particular, it is an object of the present invention to provide a playback/recording apparatus in which a cartridge can be removed without using a spring to eject the cartridge out of a slot therein. The apparatus according to the invention includes resilient members and stoppers. The resilient members engage with the cartridge after insertion and are capable of being reciprocated in the directions of insertion and discharge of the cartridge. The stoppers limit the range of reciprocation of the resilient members. During insertion of the cartridge, the resilient members engage with the cartridge and come into contact with a rearmost pair of the stoppers. The resilient members remain engaged with the cartridge so that during ejection, i.e. when the cartridge is urged toward the outside of the slot by an urging mechanism, the cartridge is positively prevented from springing fully out of the slot.

DESCRIPTION OF THE DRAWINGS

The above objects, features and advantages as well as other objects, features and advantages of the invention will become more evident upon reading the detailed description set forth below, in conjunction with the accompanying drawings, in which:

FIG. 2 is a plan view for explaining the insertion operation of a cartridge into the apparatus of FIG. 1; and FIG. 3 is another plan view for further explaining the ejection operation of the apparatus of FIG. 1.

DETAILED DESCRIPTION OF THE PREFERRED EMBODIMENT

Figure 1:
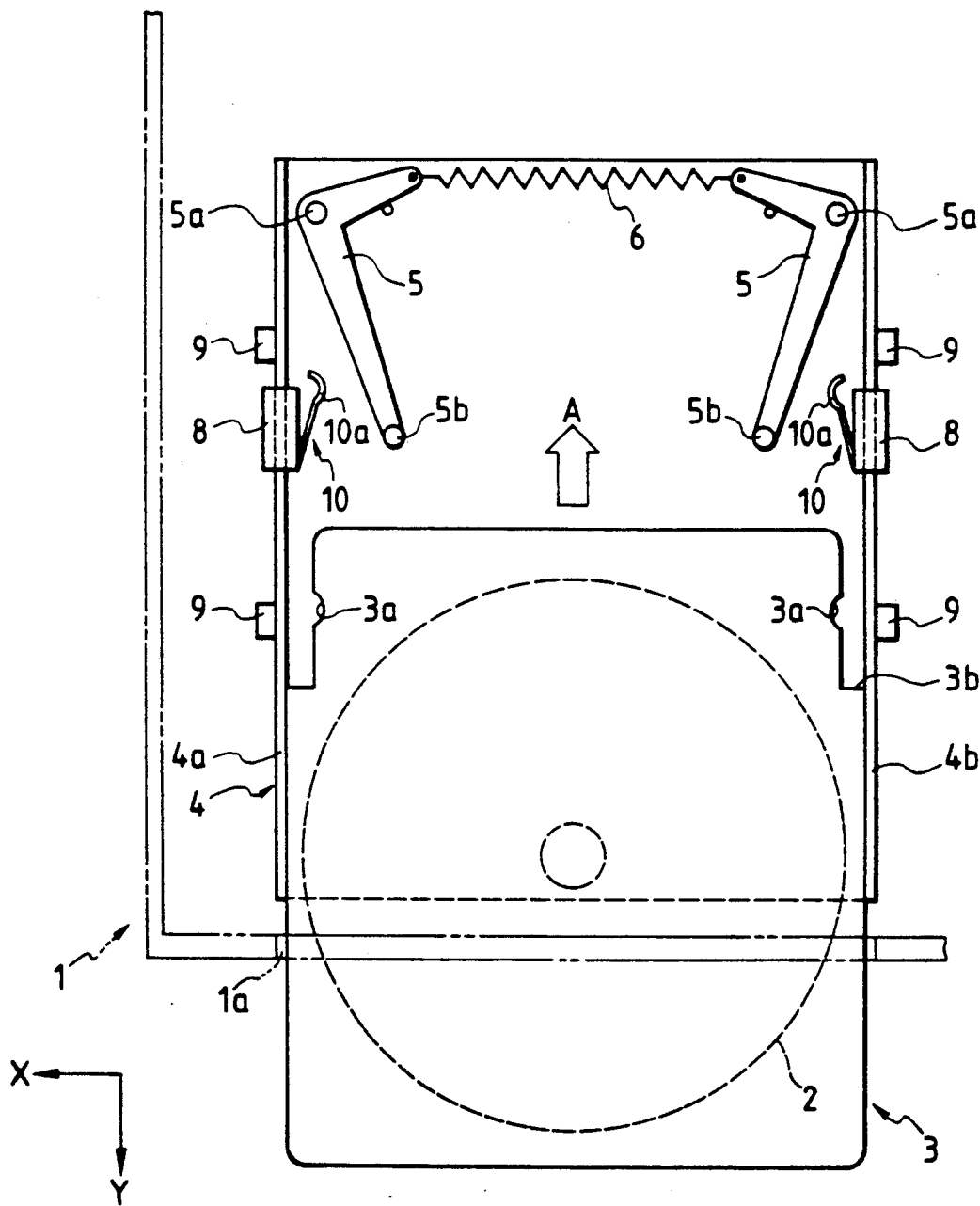
FIG. 1 is a plan view of a main portion of a playback/recording apparatus according to an embodiment of the present invention.

An embodiment of a playback/recording apparatus according to the present invention is hereafter described in detail with reference to the drawings.

As shown in FIG. 1, the apparatus for a cartridge-contained disk has a casing 1 covering a playback/recording mechanism (not shown) which includes a turntable, a pickup and so forth. The front panel of the casing 1 has a slot 1a which extends laterally with respect to a forward direction (arrow Y in the drawings). The slot is sized so that a flat cartridge 3, which rotatably supports a disk 2 therein, can be inserted into the casing through the slot. Inside the casing 1 is a cartridge holder 4 for housing the cartridge 3. The cartridge 3 is inserted into the holder 4 through an opening in the holder, which opening faces and is aligned with the slot 1a. A conveyance mechanism (not shown) is provided for conveying the cartridge holder 4, and thereby conveying the inserted cartridge 3, from a position for receiving the cartridge to a playback/recording position on the turntable, e.g. by moving the holder downward (into the page in FIG. 2). The conveyance mechanism also operates to move the cartridge holder from the playback/recording position to the cartridge-receiving position.

A pair of L-shaped levers 5 are fitted on support pins 5a proximate the rear (with respect to the forward direction Y) of the cartridge holder 4 so that the levers are swingable about the support pins. Columnar portions 5b of the levers 5 are located at the free ends of the levers. The columnar portions 5b engage the rear of the cartridge 3 to urge the cartridge toward the slot 1a to eject cartridge such that the front of the cartridge projects out of the slot, e.g. as shown in FIG. 3. A helical (tensioned) spring 6 for applying an urging force to the levers 5 is coupled to the other free ends of the levers to bias the levers toward the cartridge engaging position of FIG. 3.

The cartridge holder 4 has vertical portions or walls 4a and 4b at right and left sides, respectively, of the cartridge holder. The walls 4a and 4b extend in the direction of insertion and discharge of the cartridge 3 (in the frontward direction Y and the reverse direction thereto). Sliders 8 are slidably fitted on the walls 4a and 4b. The respective ranges of movement of the sliders 8 are limited by rearmost and forwardmost pairs of stoppers 9 mounted on the walls 4a and 4b. Resilient members (e.g. plate springs) 10 are attached at their base portions to the sliders 8 in a cantilever fashion at the front ends thereof. The cantilevered portions of the plate springs 10 extend obliquely with respect to the direction of insertion and discharge of the cartridge 3. Tip portions 10a of the plate springs 10 are formed semicircularly. The cartridge 3 is provided with corresponding semicircular recesses 3a near its rear end at the right and left sides of the cartridge so that the semicircularly-bent tip portions 10a of the plate springs 10 can be engaged in the semicircular recesses. The cartridge 3 is provided with recesses 3b at right and left sides thereof so that the cartridge 3 is surely stopped when the sliders 8 come in contact with the stoppers 9.

Operation of the apparatus constructed as described above will now be explained. The cartridge 3 is first manually inserted into the casing 1 through the slot 1a and then into the cartridge holder 4 as represented by arrow A in FIG. 1. When the cartridge has been fully inserted into the cartridge holder 4, the tip portions 10a of the plate springs 10 are disposed in the recesses 3a of the cartridge 3 and the sliders 8 are adjacent the rearmost stoppers 9, as shown in FIG. 2. At that time, the levers 5 are pressed by the rear end of the cartridge, against the urging force of the helical spring 6, such that the levers rotate and the columnar portions 5b slide toward each other. It should be noted that when the tip portions 10a of the plate springs 10 and the recesses 3a of the cartridge 3 are engaged with each other, the plate springs move together with the sliders 8 until the sliders come into contact with the stoppers 9. It should also be noted that the sliders may move rearwardly prior to the tip portions 10a engaging the recesses 3a due to friction between the springs 10 and the sides of the cartridge 3. When the cartridge 3 is completely held in the cartridge holder 4, a signal is generated by a detection mechanism (not shown). In accordance with the signal, an urging mechanism including the levers 5 and the helical spring 6 is locked in place (by a locking mechanism, also not shown) and the conveyance mechanism is operated. The conveyance mechanism carries the cartridge holder 4 with the cartridge 3 therein, so that the cartridge is placed in the playback position on the turntable. The disk 2 is thereafter ready to be played.

After the disk 2 is played, the conveyance mechanism moves the cartridge holder 4 and cartridge 3 from the playback position to the position shown in FIG. 2 for receiving a cartridge. At that time, the urging mechanism, i.e. the levers 5 and the helical spring 6, is unlocked. As a result, the spring 6 causes the levers 5 to move to the position in FIG. 3, such that the levers 5 push the cartridge 3 part way through the slot 1a. At this time, the semicircularly-bent tip portions 10a of the plate spring 10 remain engaged in the semicircular recesses 3a (shown in FIG. 1) of the cartridge 3. When the sliders 8 have come into contact with the forwardmost stoppers 9, the cartridge stops in the position shown in FIG. 3. The cartridge is thus positively prevented from springing fully out of the apparatus. The portion of the cartridge 3 which extends through the slot 1a can easily be grasped to manually remove the cartridge as represented by arrow B in FIG. 3. The cartridge 3 must be pulled with sufficient force to flex the plate springs 10 so that the tip portions 10a disengage from the recesses 3a.

What is claimed is:

1. In a playback/recording apparatus for a disk supported within a cartridge, the apparatus comprising a playback/recording mechanism for playback/recording the disk, a casing for housing the playback/recording mechanism, the casing having a slot formed therein for inserting the cartridge in an insertion direction therethrough, means for supporting the inserted cartridge, an urging means provided on the supporting means for urging the cartridge in a discharge direction toward the slot, resilient means slidably mounted for substantially linear movement on said supporting means, said resilient means including engagement portions for engaging the cartridge and thereby allowing said cartridge to reciprocate in the insertion and discharge directions, and stoppers provided on said supporting means for limiting reciprocation of said resilient means in the discharge direction, whereby said resilient means and said stoppers prevent the urging means from discharging the cartridge completely out of said supporting means.

2. A playback/recording apparatus as recited in claim 1, wherein said supporting means comprises a cartridge holder having an opening formed therein for receiving the cartridge inserted through the slot.

3. A playback/recording apparatus as recited in claim 2, further comprising means for conveying said cartridge holder with the cartridge therein between a position for receiving the cartridge inserted through the slot and a position for playback of the disk in the cartridge.

4. A playback/recording apparatus as recited in claim 1, wherein said supporting means includes first and second side walls, and further wherein said resilient means comprises respective resilient members mounted on sliders, said sliders being slidably fitted on said first and second side walls.

5. A playback/recording apparatus as recited in claim 4, wherein said resilient members each comprise a plate spring.

6. A playback/recording apparatus as recited in claim 1, wherein said engagement portions engage respective recessed portions of the cartridge.

7. A playback/recording apparatus as recited in claim 1, further comprising means for locking said urging means to prevent said urging means from urging the cartridge toward said slot, and means for releasing the locking means.

8. A playback/recording apparatus as recited in claim 1, wherein only part of the cartridge extends through said slot when said resilient means is at a limit in the discharge direction of its range of reciprocation.

9. A playback/recording apparatus as recited in claim 1, wherein said resilient means is adapted for releasing engagement with the cartridge in response to manual pulling of the cartridge in the discharge direction when said resilient means is at a limit of its range of reciprocation with respect to the discharge direction.

10. In a playback/recording apparatus for a disk supported within a cartridge, the apparatus comprising a playback/recording mechanism for playback/recording the disk, a casing for housing the playback/recording mechanism, the casing having a slot formed therein for inserting the cartridge in an insertion direction therethrough, means for supporting the inserted cartridge, an urging means provided on the supporting means for urging the cartridge in a discharge direction toward the slot, resilient means slidably mounted for substantially linear movement on said supporting means, said resilient means including engagement portions for engaging the cartridge and thereby allowing said cartridge to reciprocate in the insertion and discharge directions, and stoppers provided on said supporting means for limiting reciprocation of said resilient means in the discharge direction, whereby said resilient means and said stoppers prevent the urging means from discharging the cartridge completely out of said supporting means, further comprising additional stoppers provided on said supporting means for limiting the range of reciprocation of said resilient means in the insertion direction.

11. In a playback/recording apparatus for a disk supported within a cartridge, the apparatus comprising a playback/recording mechanism for playback/recording the disk, a casing for housing the playback/recording mechanism, the casing having a slot formed therein for inserting the cartridge in an insertion direction therethrough, means for supporting the inserted cartridge, an urging means provided on the supporting means for urging the cartridge in a discharge direction toward the slot, resilient means slidably mounted for substantially linear movement on said supporting means and for engaging the cartridge and thereby allowing said cartridge to reciprocate in the insertion and discharge directions, and stoppers provided on said supporting means for limiting reciprocation of said resilient means in the discharge direction, whereby said resilient means and said stoppers prevent the urging means from discharging the cartridge completely out of said supporting means, wherein said resilient means includes engagement portions for engaging respective recessed portions of the cartridge.

* * * * *